UNITED STATES PATENT OFFICE.

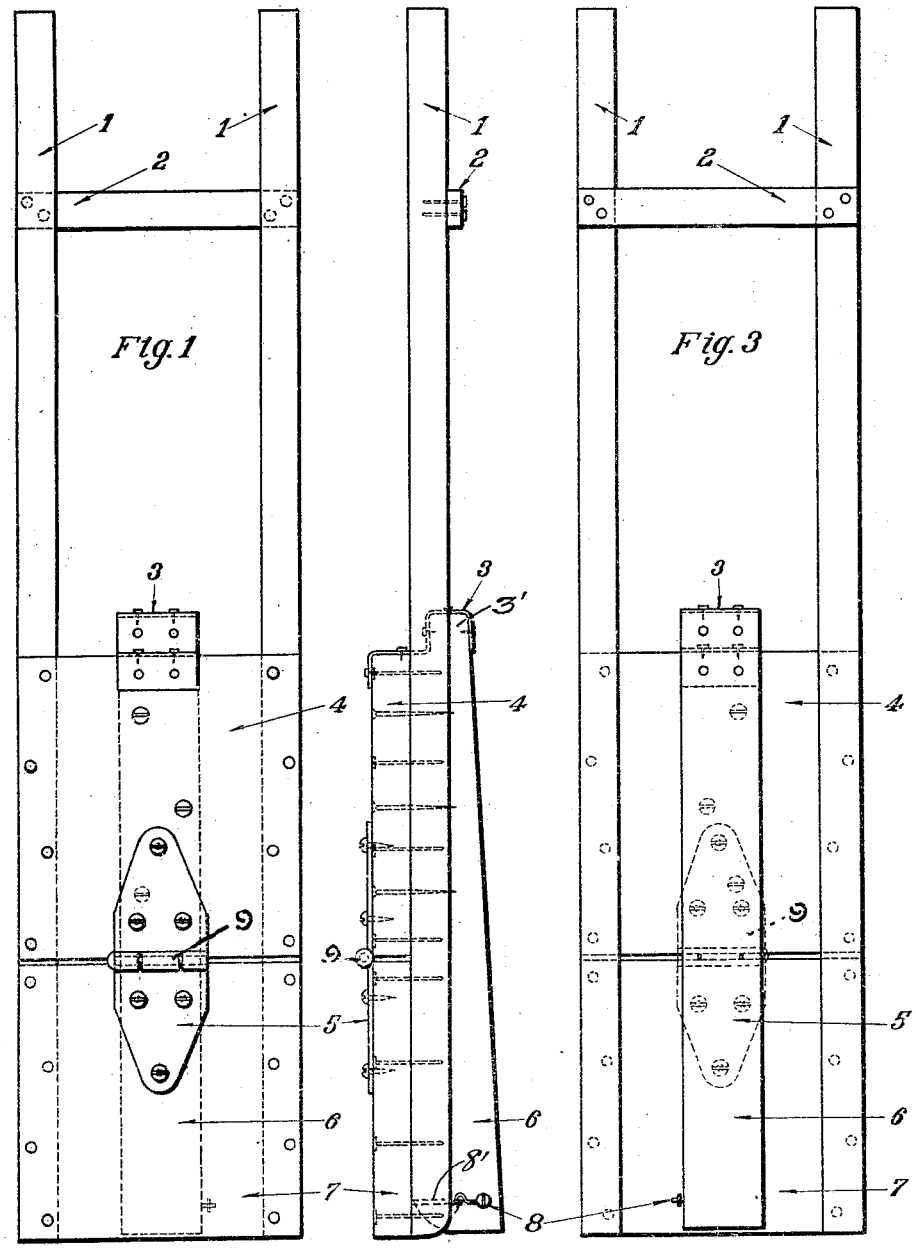

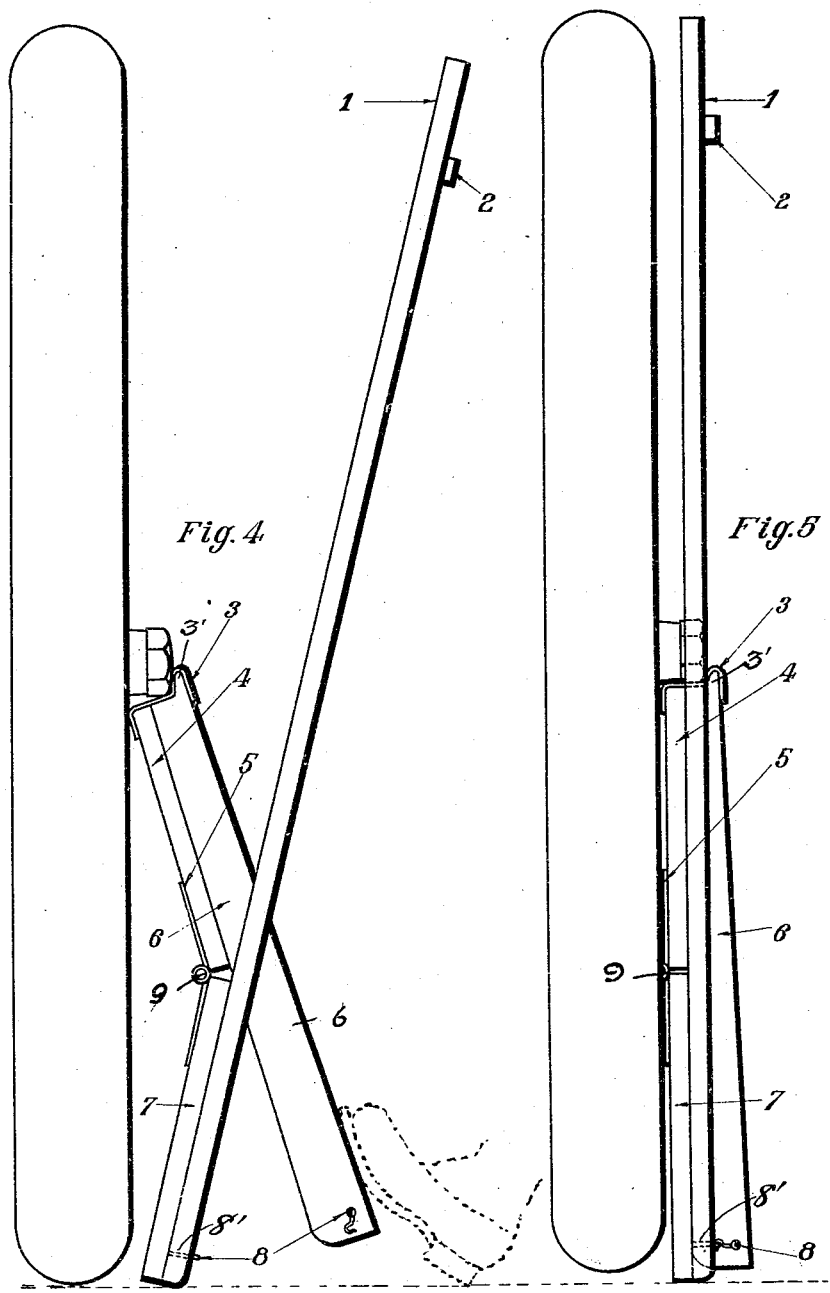

JOHN W. LAWRIE, OF HORTON, KANSAS, ASSIGNOR TO ALMA G. LAWRIE.

AUTOMOBILE-JACK.

1,297,874.   Specification of Letters Patent.   Patented Mar. 18, 1919.

Application filed August 21, 1918. Serial No. 250,830.

*To all whom it may concern:*

Be it known that I, JOHN W. LAWRIE, a citizen of the United States, residing at Horton, in the county of Brown and State of Kansas, have invented certain new and useful Improvements in Automobile-Jacks, and do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in lifting jacks and especially for use in connection with automobiles, and may be applied to the hub of a wheel in a convenient manner to lift said wheel from the ground, and consists chiefly of upper and lower hinged members which may be partly doubled and inserted under the hub of a wheel and when swung into alinement with each other their combined length is sufficient to lift the wheel from the ground.

The object of the invention is to provide a substantial and economical structure as well as one that will occupy a very small space, and may be conveniently carried on an automobile when not in use.

The invention consists of further details of construction, combination and arrangement of parts which will be hereinafter fully described, shown in the accompanying drawings and then specifically defined in the appended claim.

I illustrate my invention in the accompanying drawings which, with the numbers of reference marked thereon, form a part of this application and in which:

Figure 1 is a face view of the device.

Fig. 2 is an edge view.

Fig. 3 is a face view taken on the opposite side as shown in Fig. 1.

Fig. 4 is an edge view, as shown, applied to the hub of an automobile wheel prior to its being forced into the elevated position, and Fig. 5 shows the device similar to Fig. 4 with the parts in elevated positions and the vehicle wheel lifted from the ground.

Reference now being had to the details of the drawings by numerals:

The device consists of an upper and lower plate 4 and 7 respectively, hinged as at 9. Said plates 4 and 7 when arranged end to end, as shown, are of a combined length greater than the distance between the object to be lifted and the ground or the foundation thereof. The upper plate is provided with a protective shoe as at 3 of metal or leather to take the wear of contact with the object to be lifted, and secured to said upper member along the face opposite to that on which the hinge is mounted, is an operating lever 6 adapted to extend from said upper plate down across the face of the lower plate, in such a position as to be reached by the foot of the operator. The upper portion of the lever 6 has a shouldered portion 3' covered by the shoe 3 and against which the nut of a wheel is adapted to bear when the device is adjusted for use.

Secured to the outer face of the lower plate 7 along its marginal edges are the bars 1 connected near their upper ends by a cross piece 2.

Any preferred means of securing the parts, after the object has been lifted by the jack, may be used, but in the form shown a hook 8 mounted on the face of the lever 6 near its lower end is adapted to engage an eye 8' mounted on the member 7.

Upon reference to Fig. 4 it will be seen that when it is desired to lift an object, such as an automobile wheel, the improved jack is sprung or partially doubled on its hinges 9 and the lower edge of the lower plate 7 is placed on the ground directly under the hub, and the upper edge of the upper plate 4 is placed beneath the hub of the vehicle wheel. In the position just described the parts are arranged to readily lift the weight of the vehicle by simply placing the foot, as indicated in dotted lines, and at the same time grasping the upper ends of the arms 1 and forcing them into the position shown in Fig. 5, which will lift the object, as shown. The hook may then be caught in the eye 8' and the parts maintained in that position as long as desired without any danger of accidental displacing.

The device as above described may be quickly applied and removed from the object to be raised and owing to its construction, if properly applied under the four extremities of a car, will provide a rigid support.

It will be noted that the parts are of an extremely simple construction which may be economically constructed and when in the position shown in Fig. 5, which will be their carrying position, said device will occupy very little space.

What I claim to be new is:

A lifting jack, consisting of two plates hinged together, bars fastened to the face of the lower of said plates adjacent to the opposite marginal edges thereof and projecting beyond the hinged connection between the plates, an operating lever fastened to the face of the upper of said plates and positioned between said bars and extending nearly the length of the lower plate, and having the inner corner at its free end rounded, said lever having a shoulder at its upper end and against which the nut upon an axle is adapted to bear.

In testimony whereof I hereunto affix my signature in presence of two witnesses.

JOHN W. LAWRIE.

Witnesses:
ELLA M. ORR,
P. H. HENDERSON.